Patented June 22, 1943

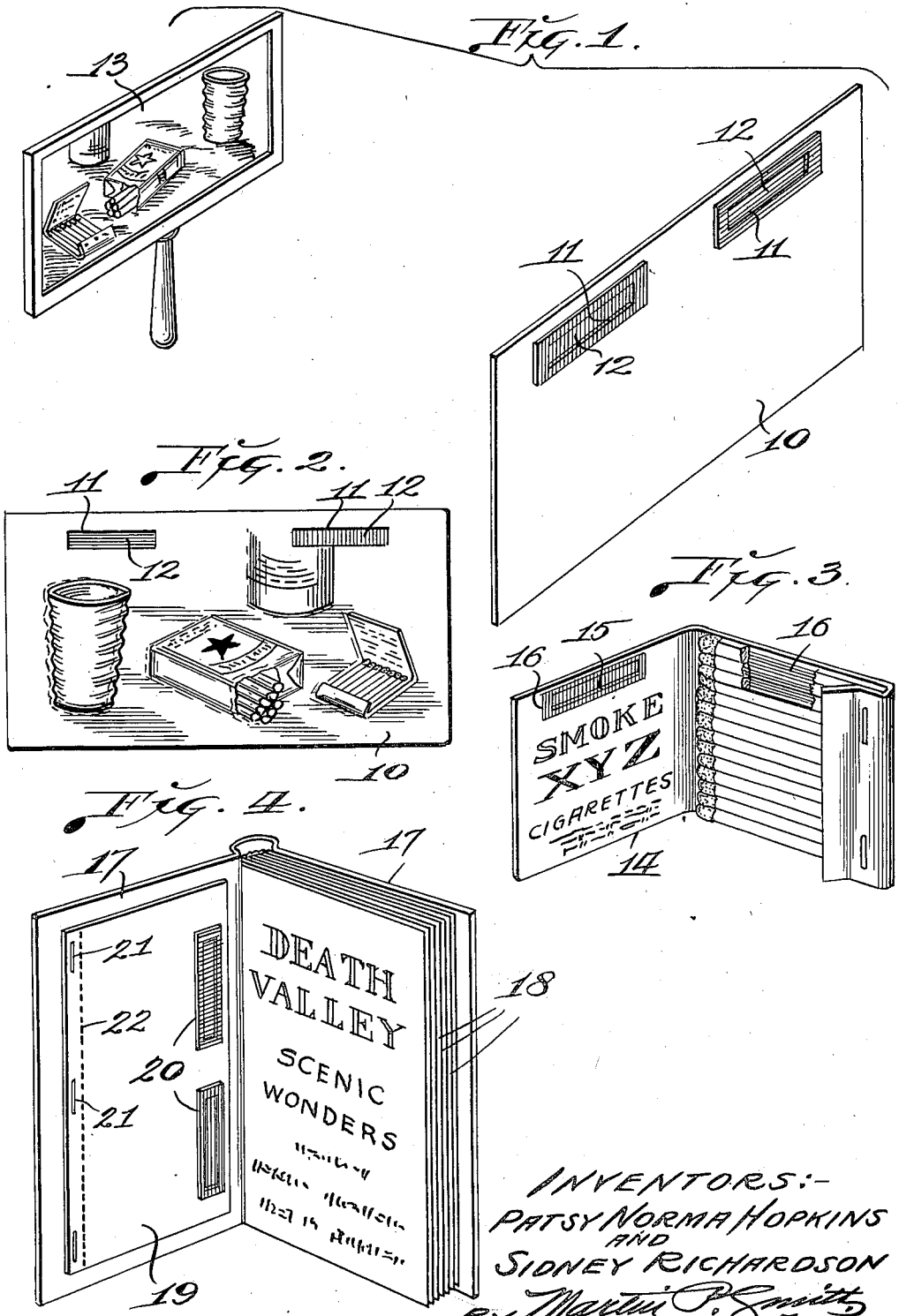

2,322,393

UNITED STATES PATENT OFFICE 2,322,393

COMBINATION STEREOSCOPIC PICTURES AND VIEWING DEVICE

Sidney Richardson, Hollywood, and Patsy Norma Hopkins, Burbank, Calif.

Application March 31, 1941, Serial No. 386,092

2 Claims. (Cl. 88—30)

Our invention relates to combination stereoscopic pictures and viewing device and has for its principal object, to provide pictures on a carrier, for instance, a sheet of paper, a card, or the like, which pictures are produced from negatives made with a stereoscopic camera, which pictures or prints are printed in contrasting colors or as polarized images, and with superimposed relation of the negatives in the final printing, thus producing in effect, a single picture which when viewed through a viewing device produces a three dimensional or stereoscopic effect.

A further object of our invention is, to provide a stereoscopic picture viewing device consisting of a carrier in the form of a card or panel of thin material having printed on one of its faces a stereoscopic picture and the card or panel having two windows or sight openings through which the user of the card or panel views the pictures, and said windows or sight openings being overlaid with pieces of thin, transparent material, preferably flexible, and of different colors, and which latter are complementary to the colors used in printing the pictures viewed by the user of the device.

Where the card carries polarized stereoscopic pictures, the transparent portions of the windows may be of the nature of polarization screens placed at oppositely effective angles with respect to the oppositely polarized stereoscopic images.

A further object of our invention is, to provide a device of the character referred to that includes a mirror or reflecting surface to be used in combination with the viewing device for reflecting the pictures or images printed on the face of the viewing device.

A further object of our invention is, to provide relatively simple, practical and inexpensive stereoscopic pictures and viewing device that may be produced in the form of a book or catalogue, with the pictures printed on the leaves thereof, and with a viewing device removably positioned within or secured to the book or a portion thereof, for instance, the cover, so that said viewing device may be conveniently removed when desired and used for viewing the stereoscopic pictures printed on the leaves of the book. Such arrangement will be found very practical and desirable in the dissemination of advertising matter, illustrated information, and the like.

With the foregoing and other objects in view, our invention consists in certain novel features of construction and arrangement of parts that will be hereinafter more fully described and claimed and illustrated in the accompanying drawing in which:

Fig. 1 is a perspective view of a stereoscopic pictures viewing device embodying our invention and showing said device positioned in front of a reflecting surface.

Fig. 2 is a view looking against the face of the viewing device that bears a stereoscopic picture.

Fig. 3 is a perspective view of a conventional match book constructed so as to be used as a viewing device.

Fig. 4 is a perspective view of a book or catalogue having a number of leaves that may be printed with stereoscopic pictures and with a viewing device detachably mounted on the inner face of the front cover of the book.

Referring by numerals to the accompanying drawing and particularly to the construction illustrated in Figs. 1 and 2, 10 designates a carrier, preferably a sheet of thin material, for instance, paper or cardboard, and of any desired size and shape, and having printed on one face thereof a stereoscopic picture. This picture is preferably produced by the use of a pair of stereoscopic lenses and the resulting negatives are used in the production of a pair of printing plates and the latter are used for making superimposed impressions upon the face of the carrier or the images may be produced by polarization methods. These impressions are differently colored, for instance, red and blue, blue and yellow, or red and green, except where polarized images are employed.

The picture thus produced on the surface of the carrier presents a blurred appearance due to the fact that the stereoscopic lenses which were used in making the two negatives are spaced apart and, therefore, one negative includes certain parts of the photographed object that do not appear in the other negative.

The face of the carrier 10 opposite the face bearing the stereoscopic picture may bear printed matter relating to the picture appearing on the other side, together with instructions as to the proper method of using the viewing device.

Formed through the carrier 10, preferably adjacent and parallel with the upper edge thereof, are spaced longitudinally disposed slots 11 which function as windows through which the eyes may view a stereoscopic picture or the reflected image thereof. Secured by suitable adhesive or otherwise to the face of the carrier 10, preferably the face opposite the face that bears the picture and covering the slots 11, are sections 12 of thin, transparent material that are differently colored so as to correspond with the colors used in the printing of the stereoscopic picture, or polarization screens placed at opposite effective angles may be placed over the openings.

Thus when the picture is printed in red and blue, the transparent members 12 are colored respectively, red and blue.

Where polarized stereoscopic pictures are to be viewed and the left hand image is vertically polarized, the corresponding transparent member is placed for vertical polarization and vice versa.

This color relation between the transparent covering members 12 and the colors of the picture prevails where the pictures are printed in blue and yellow or in red and green or any other workable combinations.

To view the picture appearing on the carrier 10, said carrier is held in front of the face with the windows covered by the transparent sections 12 positioned directly in front of the eyes, and by holding a mirror or reflecting surface such as 13 a short distance in front of the carrier, the picture appearing on the face thereof will appear on the mirror or reflecting surface, thus giving the observer a stereoscopic or three dimensional view of the picture or illustration.

This result is attained by the use of the differently colored transparent members 12 which correspond with the colors used in printing the picture and thus when the viewing device is used, each of the colored transparent members 13 filters the light so as to render one of the two images comprising the stereoscopic printing invisible to one eye and the other printed image invisible to the other eye. The same effect may be attained by the employment of polarization screens so placed as to render one of the two images comprising the polarized stereoscopic printing invisible to one eye and the other image invisible to the other eye.

In the construction illustrated, the member 10 functions both as a carrier for the stereoscopic picture and as a viewing device.

Obviously, stereoscopic pictures may be printed on separate sheets of material and viewed with the form of viewing device illustrated in Fig. 1.

In Fig. 3 we have illustrated a conventional match book 14 formed of light weight cardboard and which is provided adjacent one of its longitudinal edges with windows comprising slots 15 covered by sections of differently colored transparent material 16 or screens possessing opposite polarizing factors, and thus the viewing device may take the form of a simple and inexpensive advertising medium and as a carrier for matches.

In Fig. 4 we have illustrated a book comprising covers 17 and a series of leaves 18 on which may be printed stereoscopic pictures, for instance, of scenery or various articles of merchandise, and which pictures may be viewed through a viewing device that forms a part of the book when the same is issued.

In the construction illustrated, the viewing device is in the form of a card 19 provided adjacent one of its longitudinal edges with windows that include sections of transparent colored material 20 or polarized screens, and the opposite end of the card being secured to one of the covers of the book by suitable fastening means, for instance, staples such as 21 or by an adhesive. The main body of the card 19 may be readily separated from that portion that is secured to the book cover by tearing the card along a scored or perforated line 22.

Thus it will be seen that we have provided a combination of stereoscopic pictures and viewing device that is relatively simple in construction, inexpensive of manufacture, and which is very effective in performing the functions for which it is intended, namely, the ready and convenient viewing of pictures or illustrations with stereoscopic or three dimensional effects.

It will be understood that minor changes in the size, form and construction of the various parts of our improved combination stereoscopic pictures and viewing device, may be made and substituted for those herein shown and described, without departing from the spirit of our invention, the scope of which is set forth in the appended claims.

We claim as our invention:

1. In a combination stereoscopic pictures and viewing device, the combination with a carrier comprising a sheet of thin flat material bearing on one of its faces a stereoscopic picture, said carrier provided with a pair of spaced openings and differently colored sections of transparent material covering said openings, of a separately formed reflecting surface capable of being adjusted toward and away also vertically and laterally with respect to the picture on the carrier for reflecting the latter.

2. In a combination stereoscopic pictures and viewing device, a carrier comprising a sheet of thin flat material bearing on one of its faces a stereoscopic picture printed in contrasting colors and provided with a pair of spaced openings, sections of transparent material covering said openings, which sections are colored to correspond with the contrasting colors of the stereoscopic picture and a separately formed reflecting surface capable of being adjusted toward and away from and vertically and laterally with respect to the surface of the carrier bearing the stereoscopic picture.

SIDNEY RICHARDSON.
PATSY NORMA HOPKINS.